United States Patent
Watkins et al.

(10) Patent No.: US 7,591,017 B2
(45) Date of Patent: Sep. 15, 2009

(54) APPARATUS, AND METHOD FOR IMPLEMENTING REMOTE CLIENT INTEGRITY VERIFICATION

(75) Inventors: Craig R. Watkins, State College, PA (US); Jeremey Barrett, Sugar Land, TX (US); Adam Cain, Madison, WI (US); Brian Lichtenwalter, Santa Cruz, CA (US); Daniel Myers, Fremont, CA (US); Steven Schall, Ben Lomond, CA (US)

(73) Assignee: Nokia Inc., Irving, TX (US)

( * ) Notice: Subject to any disclaimer, the term of this patent is extended or adjusted under 35 U.S.C. 154(b) by 799 days.

(21) Appl. No.: 10/606,346

(22) Filed: Jun. 24, 2003

(65) Prior Publication Data

US 2004/0268145 A1    Dec. 30, 2004

(51) Int. Cl.
*G06F 21/00* (2006.01)
(52) U.S. Cl. .......................................... 726/24; 726/27
(58) Field of Classification Search .................. 726/12, 726/21, 22, 24, 25, 27
See application file for complete search history.

(56) References Cited

U.S. PATENT DOCUMENTS

| | | | |
|---|---|---|---|
| 5,559,800 A | 9/1996 | Mousseau et al. | |
| 5,983,348 A | 11/1999 | Ji | |
| 6,119,165 A | 9/2000 | Li et al. | |
| 6,550,012 B1 | 4/2003 | Villa et al. | |
| 6,728,886 B1* | 4/2004 | Ji et al. | 726/24 |
| 7,058,970 B2* | 6/2006 | Shaw | 726/6 |
| 2003/0177392 A1* | 9/2003 | Hiltgen | 713/201 |

FOREIGN PATENT DOCUMENTS

| | | |
|---|---|---|
| JP | 2000022754 A | 1/2000 |
| WO | WO-01/78351 A2 | 10/2001 |
| WO | WO-02/41602 A1 | 5/2002 |

\* cited by examiner

*Primary Examiner*—Gilberto Barron, Jr.
*Assistant Examiner*—Hadi Armouche
(74) *Attorney, Agent, or Firm*—Harrington & Smith, PC

(57) ABSTRACT

Apparatus, system, method and computer program product for verifying the integrity of remote network devices that request access to network services and resources. Unintended computer programs such as viruses, worms, or Trojan horses, may compromise remote devices. The invention involves downloading verification software over the web into the web browser of a client for the purpose of performing checks to verify the integrity and security of the client's device or system. The results of such checks are returned over the web to be used in security decisions involving authentication and the grant of authorization to access services and resources.

39 Claims, 9 Drawing Sheets

Fig. 8

```
Client
  Integrity
Output

Script /cls/ test.pnut ::

Working Dir:  C:\ Program Files\ Netscape\ Netscape7

File: C:\ command.com
      exists :                              true
      size :                                93890
      checksum :                            3efea3144abee232fda1719d2c1a4066
      grep (set) :                          true Dir: C:\ windows \ temp
     search (adapter.pnut ) : f             false
     search ( *. pnut ) :                   false
     search ( adapter. pnut ) :             false File: C:\ test.out
      exec (netstat -a) :                   false
      grep ( 5900 ) :                       false
      grep ( 9999 ) :                       false
      exec ( nothing ) :                    false Fangle Return :                             https: // fangle. cips.xyz.com/ cis/
                                            foofile_exists=true & false

[ Redirect ]
```

35

APPARATUS, AND METHOD FOR IMPLEMENTING REMOTE CLIENT INTEGRITY VERIFICATION

FIELD OF THE INVENTION

The apparatus, system, method and computer program product of the present invention is directed to computer security implemented by verifying the security integrity of remote network devices requesting access to network services.

BACKGROUND OF THE INVENTION

In today's technological society, the Internet is quickly becoming the preferred medium for communicating data to a broad spectrum of end-users ranging from private individuals to large multi-national corporations. Such end-users routinely employ the Internet to access and distribute information, as well as to conduct personal business. An ever-growing number of individuals, organizations and businesses have established a presence on the Internet through "Web pages" on the World-Wide Web ("the Web").

As the Internet has become more and more important in transporting data and information content between users, attacks on computer networks, in the form of computer viruses and rogue applications, have become more evident, as well. Computer viruses and rogue applications may be introduced to remote network devices by simply downloading either data or information content from unregulated computer networks or systems. Even though existing scanning utilities that are typically installed on end-usersystems are though existing scanning utilities that are typically installed on end-usersystems are designed to solve a number of integrity issues, they still have several known disadvantages and problems. More specifically, infected files may still reach an end-user's system by being downloaded from the network or copied from an external storage device without the user's knowledge. The infected files typically reside undetected on the end-user's system for a long period of time or at least until the next time a system scan is completed. In the meantime, infected files may be inadvertently passed to other end-users or computer networks. Another potential problem is that end-users forget to leave virus-checking software running, thereby allowing infected data to infiltrate their system undetected. Moreover, even if an end-user is diligent about periodically scanning his or her system, the virus scanning software used could be outdated.

Therefore, it is important to reliably preserve network integrity in today's ubiquitous Internet society. The gateway to such an environment must be capable of providing rich access control functionality while having the ability to restrict access if it would compromise network integrity.

U.S. Pat. No. 6,088,803 issued to Tso et al. (hereafter Tso) discloses one example of a known system. The system disclosed by Tso scans data objects for viruses before transmitting the objects to a remote network computer, thus, ensuring that a virus-infected data object is never delivered to a client or end-user that has requested such data or information content. However, this system does not prevent a client or end-user system from potentially infecting the network by transmitting an infected data object back to the network.

Similarly, U.S. Pat. No. 6,266,774 issued to Sam path et al. (hereafter Sam path) is directed to an integrity scheme that is downloaded to remote network devices. The downloaded software performs the necessary scanning operations and virus detection after being downloaded to the client or remote device. Thus, the purpose of such a system disclosed in Sam path is to deliver security/management software to remote devices on demand.

Thus, there appears to be a need for a reliable client integrity scheme that can consistently regulate access to network services or resources based on the observed integrity properties of remote network devices requesting access.

SUMMARY OF THE INVENTION

To overcome the limitations described above, and to overcome other limitations that will be apparent by reading and understanding the present application, the preferred embodiment of the present invention is directed to an apparatus, system, method and computer program product that provides network security by verifying the integrity of a remote device requesting access to services that reside on a network.

More specifically, the present invention involves downloading verification software via a network facility, such as an Internet web browser, that can be executed on a remote client device for the purpose of checking or scanning the remote client device to verify that the level of system security is acceptable. The verification software is downloaded to the remote client device using a Java applet, for example. If the applet is digitally signed, an administrator has the ability to read client files from disk, run programs, etc. The results of these checks are returned via the web and are used for security decisions involving the granting of authorization to access network services. This detailed information is returned so that access decisions can be made on a case-by-case or per-service basis. Additionally, the network administrator can also use this detailed information to determine if a remote device does or does not does conform to a defined "best practices" configuration for the network, as well.

A network administrator can use the gateway to define one or more variables for use in a client integrity scanning operation. This involves creating new variables on a configuration page for variables in the gateway via a graphical user interface. For example, the administrator may create a variable named "MY_INTEGRITY_LEVEL or NORTON_EXISTS." The values for these variables are supplied by the scripts created or edited by the administrator when a client integrity scan occurs. The administrator also can create one or more client integrity scripts. This involves creating and editing a script from a textbox found on the gateway configuration page. In addition, there are additional buttons for checking a script's syntax (i.e., validity check) as well as a button for test running the script via the administrator's browser. Next, the administrator specifies what client integrity scanning operation or method is to be performed before a remote user is allowed to access network services. This involves specifying a list of rules in the user interface of the access control portion of the gateway. The rules specify the conditions by which certain actions will take place. These conditions can be defined by the client's IP address, the client's browser version, the time of day, etc. An example of the actions that can be taken is as follows: 1) scan using a particular script; or 2) omit scan.

If it is determined that a scan is necessary, the administrator can specify a list of access control rules using the variables that are provided values by the client integrity scan operation. For instance, the administrator might require that a variable named "INTEGRITY_LEVEL" be set to the value "high" in order for access to sensitive data or services to be granted. This requires using an advanced view of the access control properties of the gateway to create these rules. By the same token, the administrator may use these access control rules to create certain requirements for integrity and security that may apply to all services offered through the gateway.

It is contemplated by an embodiment that an SSL is used to protect data communicated between the remote device and the gateway device.

It also is contemplated by an embodiment of the present invention that the gateway device includes an authorization-processing unit used for referenceing assigned variable values of an access control list to determine authorization of a remote network device to access a particular network service.

In addition, it is contemplated by the embodiment of the present invention that the gateway device includes a proxy server for establishing a data communication connection between the remote network device and said network server for receiving the requested network services.

Further, it is contemplated by the embodiment of the present invention that the network used for establishing communication between said remote device and said gateway uses GSM, GPRS, WAP, EDGE, UMTS or other similar wireless network protocol.

It is contemplated by an embodiment of the present invention that the remote network device is a public kiosk, personal computer, cellular telephone, satellite telephone, personal assistant or Bluetooth device.

It is also contemplated by an embodiment of the invention that the gateway is implemented using one or more processors in an internal memory that execute instructions in the form of software to perform the functions noted above.

BRIEF DESCRIPTION OF THE DRAWINGS

The accompanying figures best illustrate the details of the apparatus, system, method, and computer program product for implementing remote client integrity verification for improving network safety.

FIG. 8 is an illustrative screenshot of the test run of the script in accordance with an embodiment of the present invention.

DETAILED DESCRIPTION OF THE INVENTION

The accompanying figures best illustrate the details of the apparatus, system, method and computer program product for implementing remote client integrity verification in accordance with the present invention. Like reference numbers and designations in these figures refer to like elements.

Figure 1:
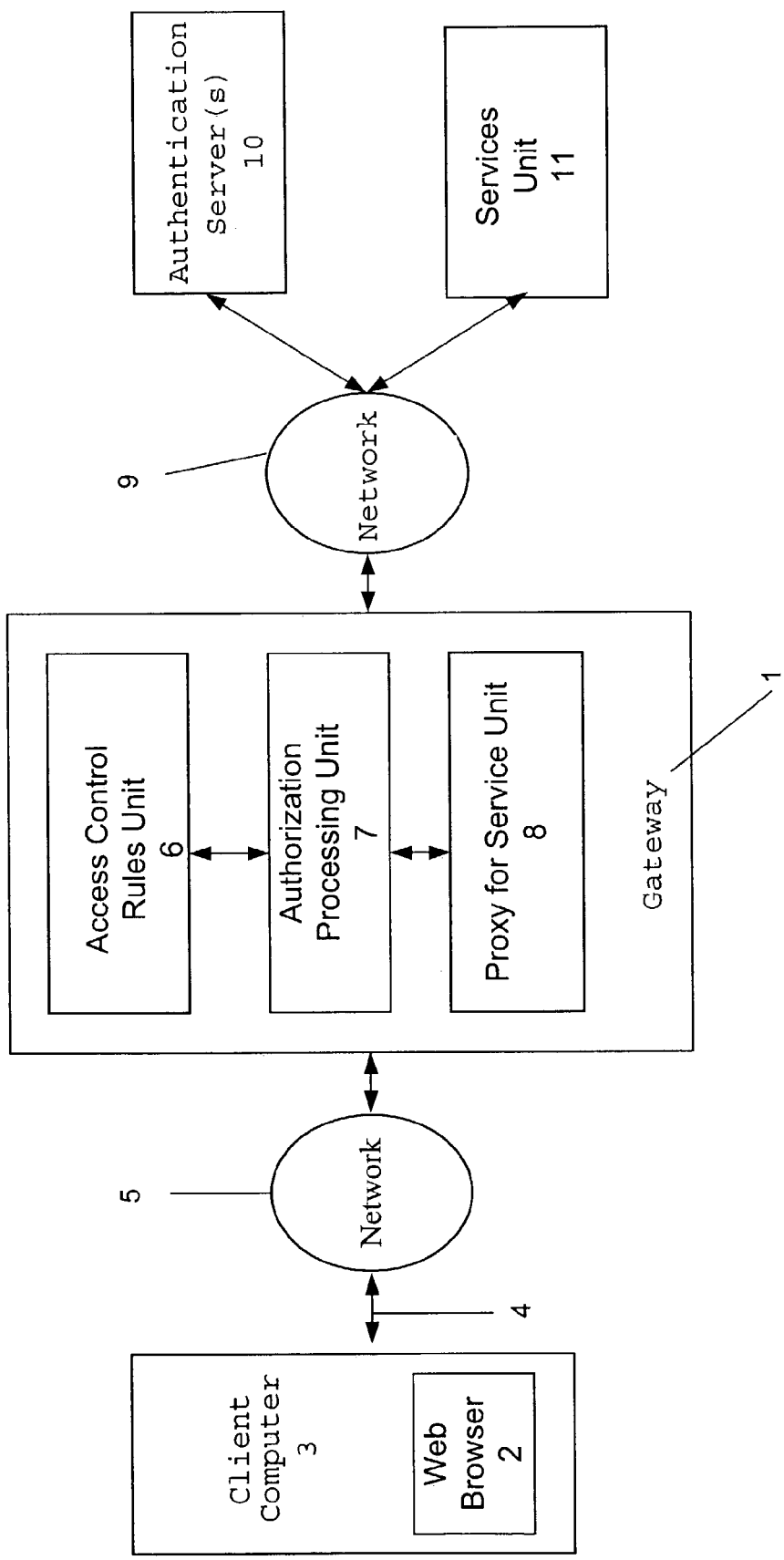
FIG. 1 is a system for implementing the integrity verification system in accordance with an embodiment of the present invention.

FIG. 1 is a system for implementing the integrity verification system in accordance with an embodiment of the present invention. In FIG. 1, it is contemplated that the remote network device 3 is a public kiosk, personal computer, cellular telephone, satellite telephone, personal digital assistant, Bluetooth device or other similar remote communication device that includes the use of one or more software applications such as a web browser 2 for accessing a public network 5. The public network 5 can be the Internet, an Intranet, mobile telephone network, PSTN, PBX or the like. Thus, the network link 4 connecting the remote network device 3 to the public network 5 can be any suitable connection to the public network 5 such as a standard modem or a connection that conforms to the principles of Bluetooth standard protocol or other wireless LAN standard protocols such as, but not limited to, shared wireless access protocol (SWAP), wireless personal area network (WPAN) protocol, high performance radio local area network (HIPERLAN) protocol, or multimedia mobile access communication (MMAC) protocol. The network connection 4 may also be any ordinary mobile telephone connection such as GSM, WAP, EDGE, UMTS, or any other similar connection.

The gateway 1 performs similar functions to a "firewall" but can be any application, system or device that is used for allowing and disallowing access to network services. For simplicity and by way of example, the function of the gateway 1 of the present invention is that of a proxy for services offered by an enterprise network 9. In order to make use of these services, the user of the remote network device 3 must sign on (authenticate) to the gateway using his/her web browser 2. The user signs on to the gateway 1 by providing authentication credentials to the gateway 1. To validate the authentication credentials, the gateway 1 may communicate with an authentication server 10 via the enterprise network 9. Regardless of the authentication scheme used, it is contemplated by the invention that the authentication may be done using a password or the like.

Before and/or after the user signs on, the gateway 1 may execute a security integrity scan of the remote network device 3, which will be explained in more detailed in the description of FIGS. 2-9. Once the user has signed on and any necessary security integrity scans have completed, the user of the remote network device 3 attempts to access services offered by a network services server 11 using his/her web browser 2. The services, if permitted, are provided via a proxy through the gateway 1 via the proxy for service unit 8 of the gateway 1. The proxy for service unit 8 conducts an application level proxy operation rather than network level filtering.

Whenever the user of the network device 3 requests access to a network service proxied by the gateway 1, the gateway 1 determines whether the user is authorized to access the service requested. The authorization is done on a per-service basis using the authorization processing unit 7 and the access control rules unit 6. The access control rules unit 6 contains access control rules that specify actions (allow or deny access) based on "variables" that are given values when a remote network device 3 signs-on and when integrity scans occur. A more detailed discussion of the variables used in accordance with the invention is included in the description of FIGS. 2-3. One of the benefits of the client integrity scanning of the present invention is that the gateway can be configured to prevent a user from accessing the gateway 1 sign-on page from a remote device that may have already been compromised by an attacker. Thus, the user will avoid entering enterprise passwords on insecure remote devices.

Configuring the gateway 1 includes specifying the access control rules for network services, specifying the scan rules governing when client integrity scans occur, and creating the scripts used during the client integrity scans.

Figure 2:
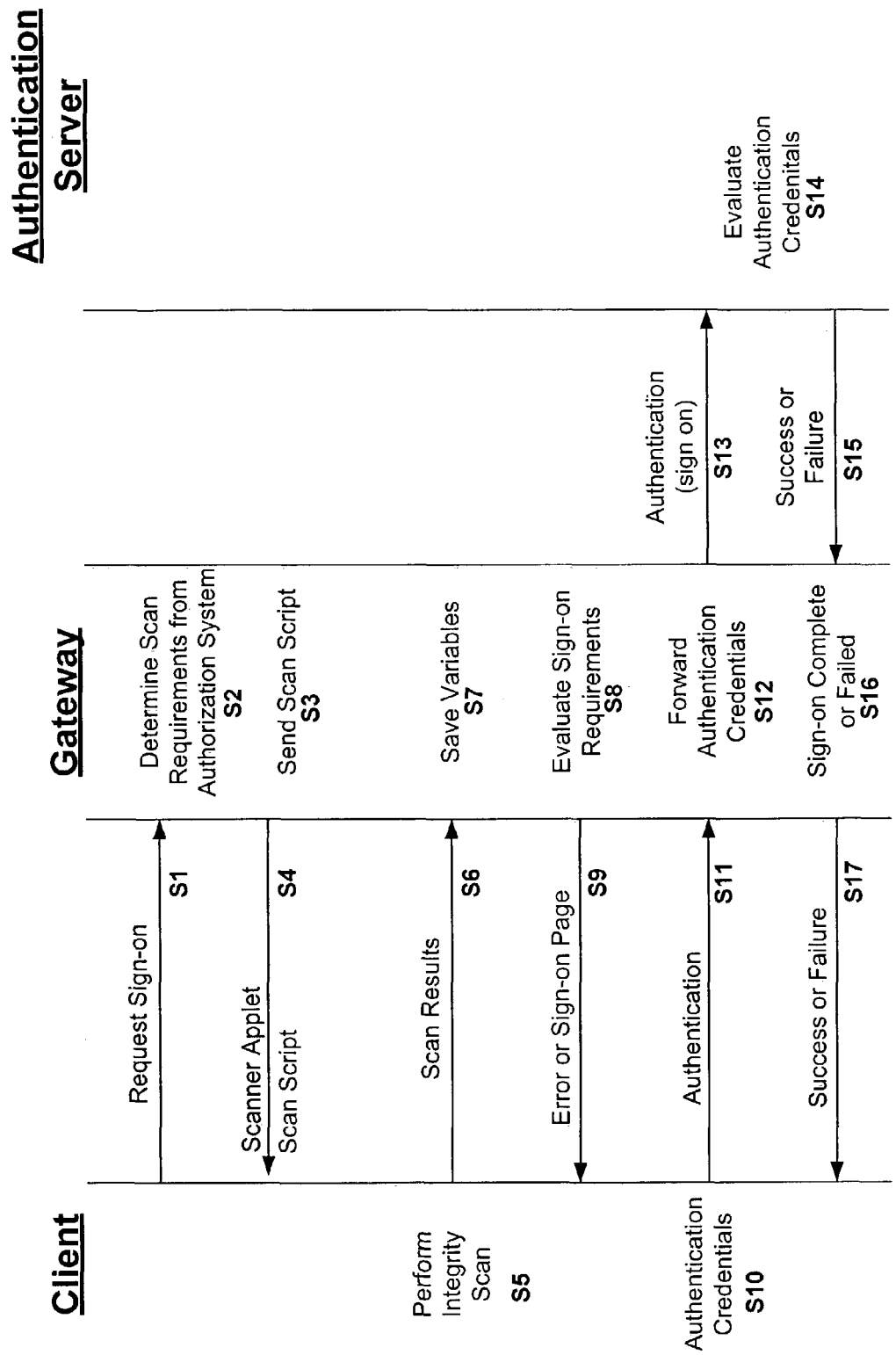
FIG. 2 is a flow chart for implementing a method of integrity verification in accordance with an embodiment of the present invention.

FIG. 2 is a flow chart for implementing a method of integrity verification in accordance with an embodiment of the present invention. More specifically, FIG. 2 illustrates in more detail the process of performing the integrity scan before a user is allowed to successfully sign-on to the gateway 1. In step S1, the user of a remote network device 3 requests to sign-on to the gateway 1 so as to receive network services from the network services server 11 on the enterprise network 9. The remote network device 3 initiates a request for the sign-on page of the gateway 1 via the web browser 2. It is contemplated by the invention that an administrator can specify requirements for signing onto the gateway 1. For example, the administrator goes to a sign-on rules configuration page (not shown). On this page, the administrator specifies a rule list used to determine what actions should be taken when a remote user requests the sign-on page. By way of example, the following are some of the actions that can be taken:

Omitting scan (proceed directly to sign-on page)
Scan the client platform with a specified scan script Each rule has a condition that specifies when an action is to be taken. The conditions are expressed in terms of variables that are evaluated by the access control rules unit 6 that process client requests. The following is an example of the some of the variables that can be used to express conditions in the rules used for "sign-on":

CLIENT_IP—the IP address of the client platform
BROWSER_USER_AGENT—the HTTP header value indicating the name of the client user's Web browser (e.g., "Mozilla/4.04 [en] (WinNT; I ;Nav)")
SSL_STRENGTH—an indicator of the SSL cipher strength for the SSL-protected connection between the web browser 2 and the gateway 1.
TIME_OF_DAY—the current local time on the gateway 1.
DAY_OF_WEEK—the name of the day of week (e.g., "Monday", "Tuesday", etc.)

Some example scan rules are as follows:
OMIT SCAN IF (CLIENT_IP="10.0.1.2")
SCAN: some_script IF (USER_AGENT="*MSIE*")

The rules of the sign-on rules page are evaluated in a "first match" algorithm. Thus, there is only one action that is picked from the list when a user requests to sign-on to the gateway 1.

In step S2, the gateway 1 either routes the user directly to the sign-on page, or determines that the user's remote network device 3 should be scanned for security integrity. The determination to run a scan or not depends on the gateway configuration and the value of the variables referenced in the scan rules; for example, the client computer's IP address, browser version, etc. It is contemplated by the invention that different scan scripts may be used under different conditions; e.g., "script-A" may be used to scan remote users in one IP address domain, while "script-B" may be used for users in a different domain.

If the gateway 1 in step S3 determined that a scan is to be performed, then in step S4, the gateway 1 downloads to the web browser 2 of the remote network device 3 an applet along with a scan script to be run by the applet. It is contemplated by the invention that the scan script is run on the platform of the remote network device 3 using a signed Java applet. In step S5, the signed applet uses the script to scan the user's remote network device by, for example, reading files, reading directories, checking for running programs, running various command or the like. In step S6, after the scan is done, the applet assigns values to certain variables that are specified in the scan script. For example, the applet sends the results of the scan in the form of multiple pairs (e.g., "variable=value") to the gateway 1. In step S7, the gateway 1 then stores the values assigned to each variable specified in the scan script in a memory location (not shown) for later use in the user's session.

Assuming that the results of the client integrity scan is acceptable, as determined in step S8, then the gateway 1, in step S9, returns the sign-on page to the user's browser.

As part of the sign-on process, the user in step S10 and step S11 sends authentication credentials to the gateway 1. The authentication credential can be, for example, a password entered by the user or the like. These credentials may be evaluated by the gateway 1 itself using local password database, or the gateway 1 may make use of an external authentication server 10 to verify the credentials. In step S12, the gateway 1 receives the user's credentials and in step S13 forwards the user's credentials to the authentication server 10.

In step S14, the authentication server 10 evaluates the user's credential and in step. S15 responds to the gateway 1 whether the authentication succeeded or failed. In step S16, the gateway receives the authentication verification results from the authentication server 10. If the results of the authentication process are successful, the gateway 1 then begins a user session for the subsequent communication between the remote network device 3 and the gateway 1. If the results indicate failure, the gateway 1 allows the client user another opportunity to sign on with different credentials. In step S17, the gateway transmits a message to the network device 3 indicating whether sign-on was successful or failed.

After the user has successfully signed on, the user can make a request for services from the network service server 11. Upon receiving the request, the gateway 1 consults its access control rule lists to determine if the user is authorized receive the requested service from the network. The access control rules in the access control rule unit 6 can reference the variables that are assigned values as a result of a client integrity scan. A user's access to a requested network service may or may not be allowed based on the values assigned to the variables at the end of the scanning process. In this way, the gateway 1 is able to regulate access to network services based on the results of the scanning process.

Figure 3:
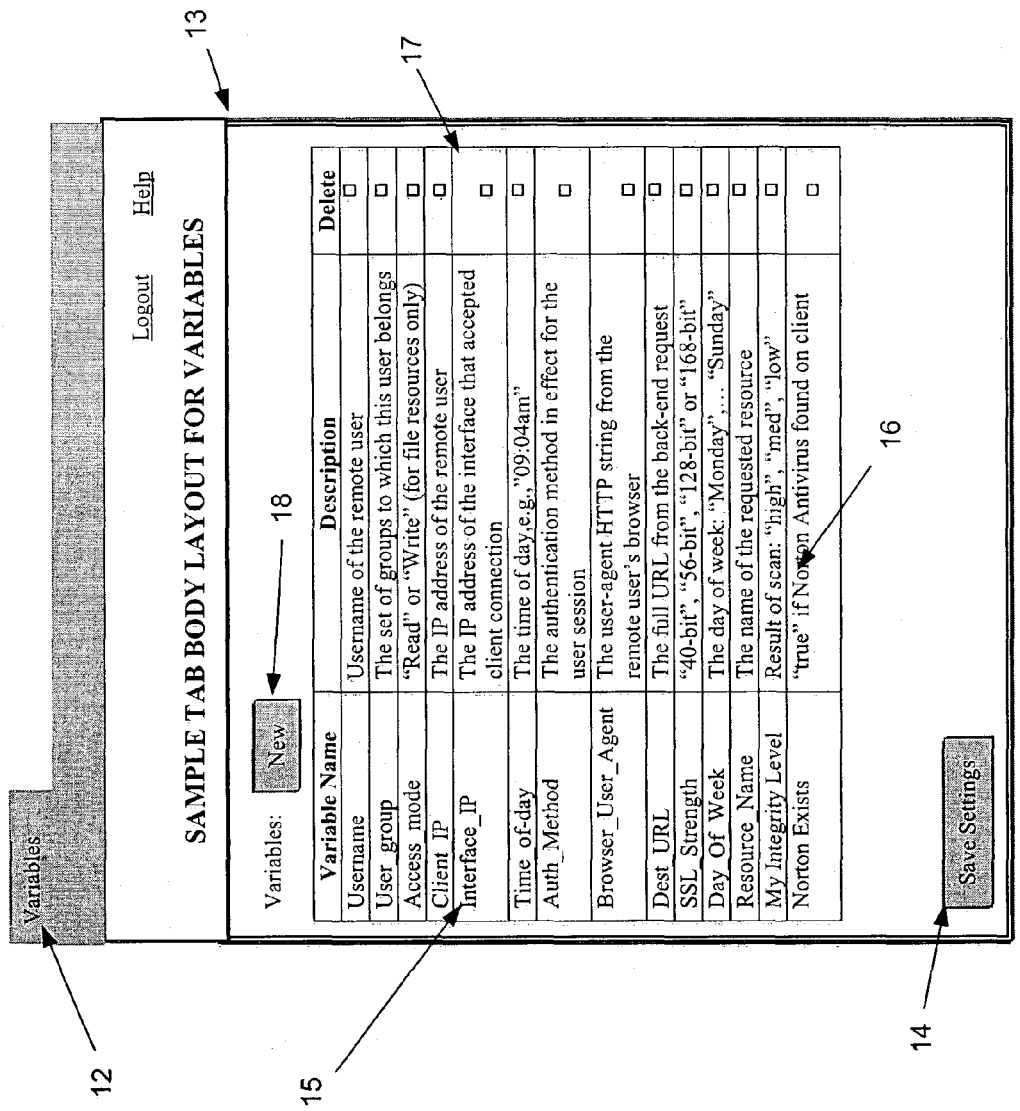
FIG. 3 is an illustrative screenshot of the variables used in accordance with an embodiment of the present invention.

FIG. 3 is an illustrative screenshot of the variables managed by the gateway 1 and used in accordance with the preferred embodiment of the present invention. Such pages appear as part of the graphical user interface of the configuration system used by the administrator. The variables can be both predefined, such as USERNAME, TIME_OF_DAY and CLIENT_IP, or can be created by the administrator. The predefined variables can be used to specify conditions that govern when a client integrity scan takes place; for instance, the administrator can specify that scans occur with a particular script whenever the CLIENT_IP variable has a specified value representing an IP address of interest. Variables created by the administrator can be used to receive the output of client integrity scans, assuming that the relevant scripts reference the desired variables by their proper names. For instance, the administrator might create a variable named VIRUS_FOUND and then create a client integrity scan script that assigns the value of VIRUS_FOUND to either "yes" or "no". The screenshot in FIG. 3 shows an example list 13 of all variables defined on the gateway 1, including both predefined variables and variables created by the administrator. The variable names are listed 15 along with brief descriptions 16 of each variable. The administrator can delete variables created by the administrator using the Delete checkboxes 17 along with the "Save Settings" button 14. The administrator can create new variables using the "New" button 18, leading the administrator to the variable definition page shown in FIG. 4.

Figure 4:
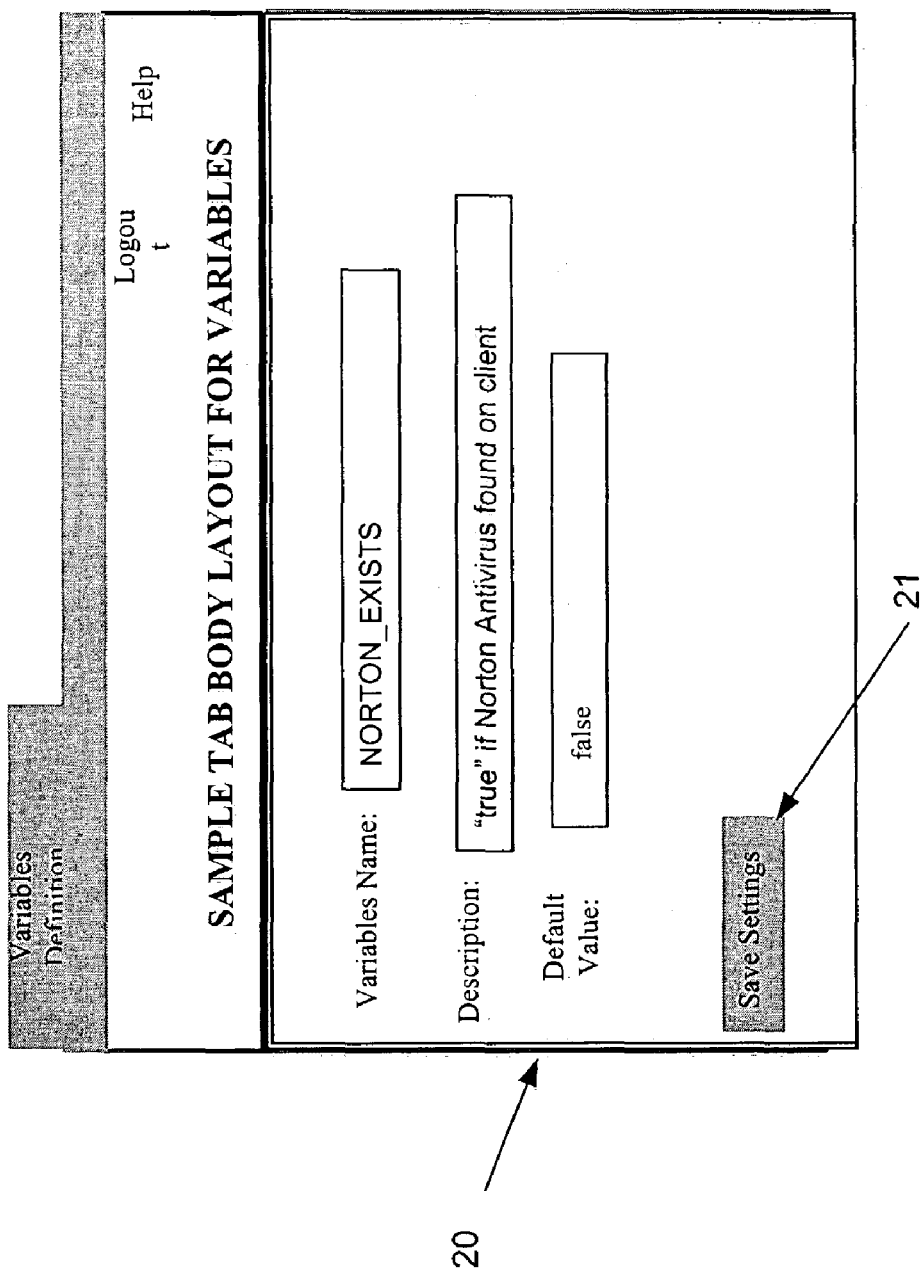
FIG. 4 is an illustrative screenshot of the variable definitions used in accordance with an embodiment of the present invention.

FIG. 4 is an illustrative screenshot of the variable definition configuration page used in accordance with an embodiment of the present invention. From the variable definition page 20, an administrator may specify a variable name, a variable description and a default value for that variable. It is contemplated by the invention, that when a client integrity scan is omitted or fails to execute, the variable is assigned its default value. Once editing of a variable has been completed, pressing the "Save Setting" button 21, on the variable definition page 20 can save the changes.

Figure 5:
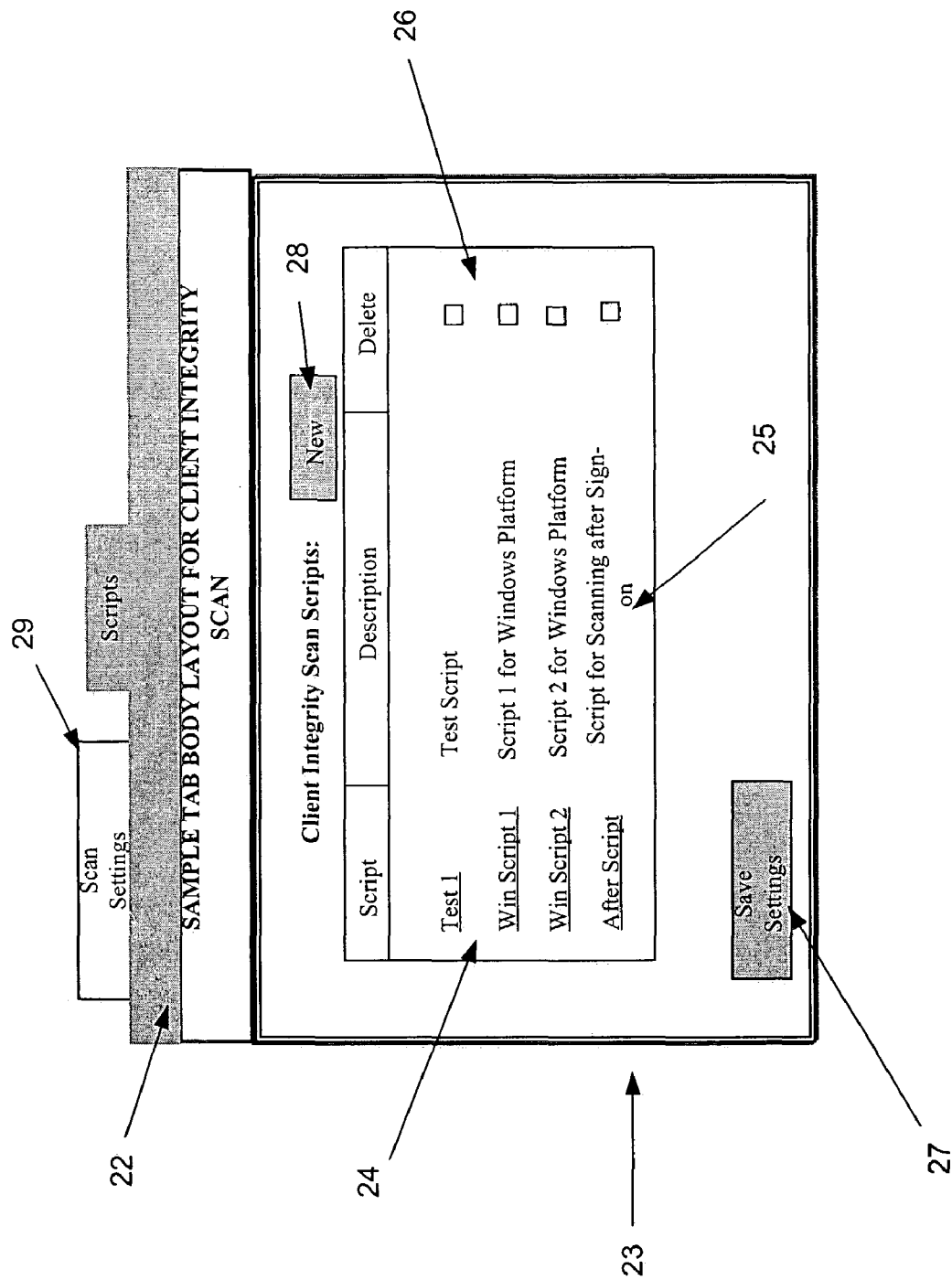
FIG. 5 is an illustrative screenshot of the script used in accordance with an embodiment of the present invention.

FIG. 5 is an illustrative screenshot of the configuration page used to manage client integrity scripts used for running a scanning process in accordance with an embodiment of the present invention. The Client Integrity Scan Scripts page 23 lists all the scripts 24 currently defined in the gateway 1, which may initially include a number of sample scripts. Each script is listed showing the script name 24 as well as a text description 25 of the script specified by the administrator. From this script page 23, new scripts 24 can be added or deleted by selecting the the "New" button 28. Existing scripts can be deleted by clicking the corresponding "Delete" checkboxes 26 and selecting the "Save Settings" button 27. Additionally, each script listed has a corresponding script definition (not shown) that is specified by the administrator. By clicking on the script name 24 the administrator views a configuration page that allows the administrator to modify the definition of an existing script.

Figure 6:
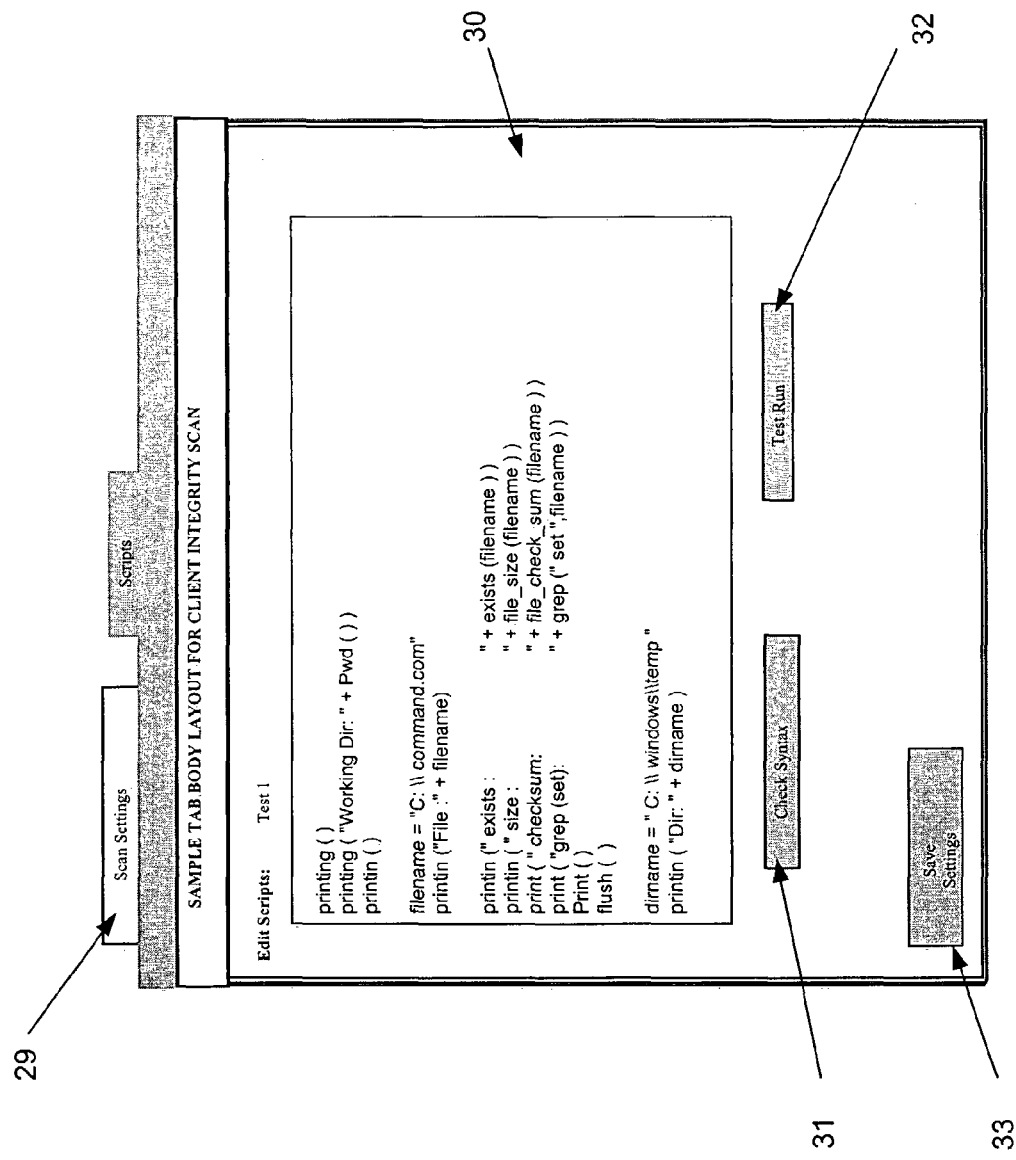
FIG. 6 is an illustrative screenshot of the script definition in accordance with an embodiment of the present invention.

FIG. 6 is an illustrative screenshot of the script definition configuration page in accordance with an embodiment of the present invention. To edit an existing client integrity script, the administrator can select the desired script 24 from the list on the script page 22. The administrator can also create a new script by selecting the "New" button 28 on the script page 22. In either case, the administrator is taken to a script definition page 30 to view or enter the script contents in a large textbox 29. From this page 30, the administrator can edit or add script contents in the textbox 29 and save the changes using the "Save Settings" button 33. On this page 30, there are also two additional buttons: 1) "Check Syntax" 31; and 2) "Test Run." 32.

Figure 7:
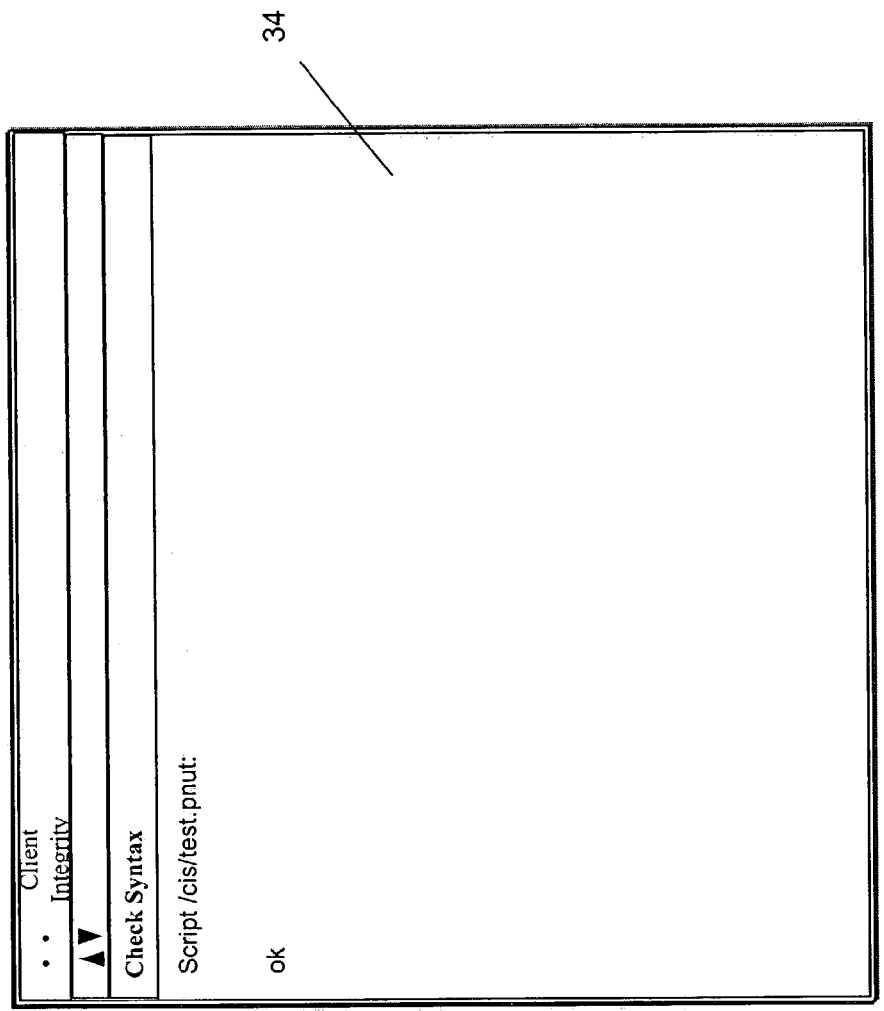
FIG. 7 is an illustrative screenshot of the check syntax operation in accordance with an embodiment of the present invention.

By way of example, FIG. 7 illustrates that upon hitting the "Check Syntax" button 31, the gateway 1 performs the following actions:
saves the current script contents to a temporary file on the gateway 1 opens a new browser window on the administrator's remote network device 3, giving it an HTML page with the client integrity applet set to check syntax on the specified script. The applet runs in the new browser window and displays 34 any syntax errors found in the script. As seen in FIG. 8, when the "Test Run" button 32 is selected, the applet executes the specified script saved in the temporary memory and displays output 35 as specified in the contents of the script.

It is further contemplated by the invention that when a client integrity scan occurs, either for an administrator using the "Test Run" button 32 or the "Check Syntax" button 31, or for a non-administrative user attempting to sign on to the gateway 1, the gateway 1 returns an HTML page to the web browser. The HTML page contains tags that instruct the web browser to load a Java applet from the gateway 1. The HTML page also contains parameters that are supplied as inputs to the Java applet once it is running in the web browser. The inputs instruct the Java applet to retrieve a particular client integrity scan script from the gateway 1.

Once the Java applet has obtained the specified client integrity script, the applet performs the checks specified in the script via the scripting language. When running in normal mode as part of a non-administrative user's request to sign on to the gateway, the remote user will only see a progress bar. When the administrator is performing a check syntax run or a test run, the applet will display output appropriate to the run. When the applet finishes, it will report its results to the gateway 1 using the "gateway_return( )" function of the scripting language.

It is further contemplated by the invention that in some cases, remote users attempting to sign onto the gateway 1, will be immediately redirected to the actual sign-on page. Note that there should never be a case where the remote user cannot get to the sign-on page due to problems with running the client integrity scanner. Even in cases where client integrity scanning fails to run, the remote user should be eventually sent to the sign-on page. If access control requirements disallow the remote user's access request for the sign-on page (perhaps due to a requirement that certain client integrity scan output variables take particular values), the user should see a message making it clear that their access to the sign-on page is not permitted.

It is further contemplated by an embodiment of the invention that the following functions are additions to the scripting language provided for use with the gateway 1. Each function is listed along with the type of value it returns.

| | |
|---|---|
| file_exists(fileName) | T/F |
| file_search(dir, pattern, recurse) | T/F |
| file_checksum(fileName) | num/String |
| file_size(fileName) | num |
| grep(pattern, fileName) | T/F |
| run_prog(CLI-string, out_file) | T/F |
| program_running(program_name) | T/F |
| gateway_return(name1, value1, name2, value2, . . . ) | |

It is further contemplated by an embodiment of the invention that the Java applet that performs the client integrity scan be digitally signed by the applet developers. Signed applets can be accepted as trusted by the user of the web browser, resulting in additional abilities extended to the Java applet running on the client system. For instance, a digitally signed Java applet can be allowed to read files on the client system, whereas unsigned Java applets are unable to access such files. The use of a signed Java applet for client integrity scanning allows the applet to perform the checks associated with the script functions listed above.

Figure 9:
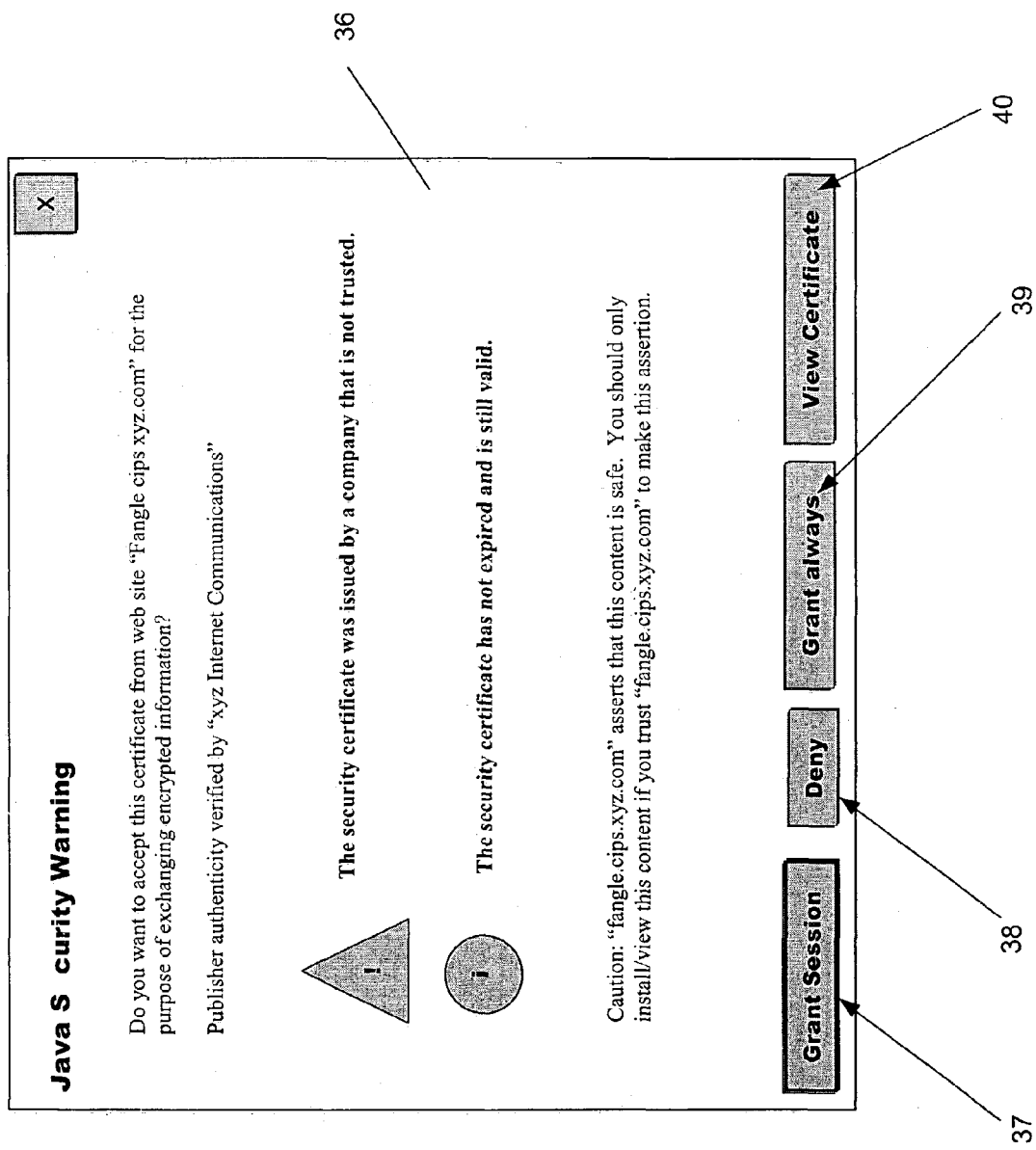
FIG. 9 is an illustrative screenshot of a Java security warning page, in accordance with the invention.

FIG. 9 is an exemplary screenshot of Java security page 36; the page includes several controls regarding a certificate, such as Grant Session button 37, Deny button 38, Grant Always button 39, and View Certificate button 40.

It is contemplated by an embodiment of the invention that the gateway can also be implemented using one or more processors in an internal memory that execute instructions in the form of software to perform the functions noted herein.

It should be emphasized that although illustrative embodiments have been described herein in detail, that the description and drawings have been provided for purposes of illustration only and other variations both in form and detail can be added thereupon with departing from the spirit and scope of the invention. The terms and expressions herein have been used as terms of description and not terms of limitation. There is no limitation to use the terms or expressions to exclude any equivalents of features shown and described or portions thereof.

We claim:

1. An apparatus, comprising:
   a proxy configured to receive a request for network services by at least one remote network device and to perform a security integrity scanning operation on the requesting remote network device, wherein the security scanning operation is performed before and after the remote network device signs on to the proxy; and
   an authorization processor and access rules controller configured to determine if the remote network device is authorized to access the requested network services based on the results of the security scanning operation.

2. The apparatus as recited in claim 1, wherein the proxy is configured to make integrity security decisions regarding access to network services by a remote network device on a request-by-request basis.

3. The apparatus as recited in claim 1, wherein the access rules controller comprises a plurality of variables used to generate a set of security properties for each remote network device.

4. The apparatus as recited in claim 3, wherein the set of security properties may be different for each remote network device that accesses and requests service through the network.

5. The apparatus as recited in claim 1, wherein the proxy is configured to use at least one script to select of the type of scanning operations to be performed for each remote network device accessing the network.

6. The apparatus as recited in claim 5, wherein the proxy is configured to use a Java applet to execute the desired script on the remote network device.

7. The apparatus as recited in claim 6, wherein a signed applet executing the script, is allowed to access the remote network device for the purposes of executing programs as well as to search and read specific data files that reside on the remote network device.

8. The apparatus as recited in claim 1, wherein the authorization processor is configured to refer to a series of variable values in the access rules controller to determine if a remote network device is authorized to access the requested network service.

9. A system, comprising:
   at least one remote network device configured to access a network via a network connection to make a request for one or more network resident services;
   a gateway configured to receive the request for services and perform a security integrity scanning operation on the remote network device prior to allowing access to the requested network services, wherein the security scanning operation is performed before and after the remote network device signs on to the gateway;
   an authentication server configured to verify user authentication credentials of users of remote network that access the network; and
   at least one network server configured to provide requested network services to at least one remote network device accessing the network through the gateway.

10. A method, comprising:
    performing scanning process and reporting result used in scanning script, comprising at least one variable defined to be used as a vehicle to convey results of a scanning process;
    performing at least one scanning operation on the remote network device to verify a security integrity of the remote device, wherein the scanning operation is performed before and after the remote device signs on to a gateway device which is configured to perform the scanning operation; and
    providing the results of the scanning operation for purposes of determining whether or not the remote network device is authorized to access a requested network services.

11. The method as recited in claim 10 wherein, the making of security decisions with regard to the request for network services by a remote network device is done on a per-request basis.

12. The method as recited in claim 10 wherein, an array of variables is used to generate a set of security properties for each remote network device.

13. The method as recited in claim 12, wherein the set of security properties may be different for each remote network device that accesses and requests service through the network.

14. The method as recited in claim 10, further comprising:
    selecting at least one script for the type of scanning operation to be performed for each remote network device that accesses the network.

15. The method as recited in claim 14, further comprising:
    executing the desired script on the remote network device by using a signed Java applet.

16. The method as recited in claim 15, further comprising:
    using a signed applet for executing the script to access the remote network device for the purposes of executing programs, searching, and reading specific data files that reside on the remote network device.

17. The method as recited in claim 10, further comprising:
    assigning a values to a set of variables in the verification software resulting from the scanning process of the remote network device.

18. The method as recited in claim 10, further comprising:
    using secure socket layer to protect the data communicated between the remote device and the gateway.

19. The method as recited in claim 17, wherein referencing an assigned series of variable values in the access control rules determines if a remote network device is authorized to access the requested network service.

20. The method as recited in claim 10, further comprising:
    making authorization decisions based in part on results returned by the scanning process.

21. The method as recited in claim 10, further comprising:
    transmitting and receiving data, information and applications content between a remote device and the gateway comprises global system for mobile communications, general packet radio service, wireless application protocol, enhanced data for global system for mobile communications evolution, or universal mobile telecommunication system.

22. The method as recited in claim 10, wherein the remote network device is a public kiosk, personal computer, cellular telephone, satellite telephone, personal assistant or Bluetooth device.

23. A method, comprising:
    defining at least one access control policy for accessing network services wherein the access control policy depends, at least in part, on the results of an integrity scan performed on a remote network device;
    specifying what scan scripts are to be used under what conditions to the remote network device;
    receiving at least one result of an integrity scan from the remote network device at a gateway device, wherein the integrity scan is performed before and after the remote device signs on to the gateway device; and regulating access by the remote network device to network services via the gateway device based, at least in part, on the results of the integrity scan.

24. The method as recited in claim 23, further comprising: making access control decisions with regard to a remote network device on a per-service basis.

25. The method as recited in claim 23, further comprising: using at least one defined variable in each access control policy.

26. The method as recited in claim 23, further comprising: sending the results of the integrity scan to the gateway in the form of an assigned value for the defined variable.

27. The method as recited in claim 23 further comprising: using a script to specify the integrity scan operations that will be performed on the remote network device.

28. The method as recited in claim 23, further comprising: using a signed Java applet as verification software to be downloaded to the remote network device.

29. The method as recited in claim 27, further comprising: using a signed applet executing the script to access the remote network device for executing programs, searching, and reading specific data files that reside on the remote network device.

30. The method of claim 23, wherein a plurality of variables is used to determine the access control policy for each remote network device accessing the network.

31. The method as recited in claim 30, wherein the access control policy for each remote network device is different.

32. The method as recited in claim 28, wherein referencing to an assigned series of variable values in the access control rules determines if a remote network device is authorized to access the requested network service.

33. The method as recited in claim 23, further comprising: using secure socket layer to protect data communicated between the remote device and the gateway.

34. The method as recited in claim 23, further comprising: making authorization decisions based in part on results returned by the scanning process.

35. The method as recited in claim 23, further comprising: transmitting and receiving data, information and applications content between a remote device and the gateway using either global system for mobile communications, general packet radio service, wireless application protocol, enhanced data for global system for communications evolution, universal mobile telecommunication system or other similar wireless network protocol.

36. The method as recited in claim 23, wherein the remote network device is a public kiosk, personal computer, cellular telephone, satellite telephone, personal assistant or Bluetooth device.

37. An apparatus, comprising:
proxying means for receiving a request for network services by at least one remote network device and to perform a security integrity scanning operation on the requesting remote network device, wherein the security scanning operation is performed before and after the remote network device signs on to the proxy; and
authorization processing means and access rules controlling means for determining if the remote network device is authorized to access a requested network services based on the results of the security scanning operation.

38. A computer program product comprising a program, embodied on a computer-readable medium, configured to control a processor to implement a method, the method comprising:
performing scanning process and reporting result used in scanning script, including at least one variable defined to be used as a vehicle to convey results of a scanning process;
performing at least one scanning operation on the remote network device to verify a security integrity of the remote device, wherein the scanning operation is performed before and after the remote device signs on to a gateway device which is configured to perform the scanning operation; and
providing the results of the scanning operation for purposes of determining whether or not the remote network is authorized to access a requested network services.

39. A computer program product comprising a program, embodied on a computer-readable medium, configured to control a processor to implement a method, the method comprising:
defining at least one access control policy for accessing network services wherein the access control policy depends, at least in part, on the results of an integrity scan performed on a remote network device;
specifying what scan scripts are to be used under what conditions to the remote network device;
receiving at least one result of an integrity scan from the remote network device at a gateway device, wherein the integrity scan is performed before and after the remote device signs on to the gateway device; and
regulating access by the remote network device to network services via the gateway device based, at least in part, on the results of the integrity scan.

\* \* \* \* \*